United States Patent Office 3,005,828
Patented Oct. 24, 1961

3,005,828
PHENOXYACETOXY-BUTYNE-2 DERIVATIVES
Joseph R. Baldridge, Mentor, Ohio, assignor to Diamond Alkali Company, Cleveland, Ohio, a corporation of Delaware
No Drawing. Filed July 28, 1958, Ser. No. 751,153
11 Claims. (Cl. 260—326)

This invention relates to novel compounds having the structure

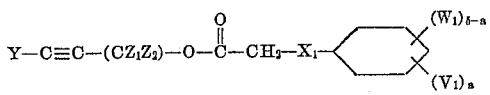

wherein Y is selected from the group consisting of hydrogen, and

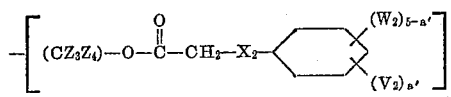

$a$ and $a'$ are numbers from 0 to 5, inclusive, $X_1$ and $X_2$ are selected from the group consisting of oxygen, NH, and

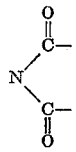

$Z_1$, $Z_2$, $Z_3$, and $Z_4$ are the same or different radicals from the group consisting of hydrogen, alkyl and aryl radicals, $W_1$ and $W_2$ are hydrogen and $V_1$ and $V_2$ are the same or different radicals selected from the group consisting of halogens, including chlorine, fluorine, bromine and iodine, alkyl radicals, OH radicals, NO radicals, $NO_2$ radicals, $SO_2NH_2$ radicals, and $SO_3H$ radicals.

More particularly, the present invention is directed to novel compounds having the structure

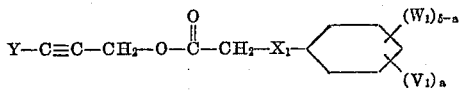

wherein Y is selected from the group consisting of hydrogen and

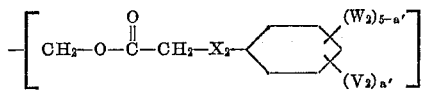

and $a$ and $a'$, $X_1$ and $X_2$, $W_1$ and $W_2$, and $V_1$ and $V_2$ are as defined hereinabove.

Compounds of this invention have general utility as biologically active substances and have exhibited specific biological activity as herbicides, aphicides, fungicides, defoliants and the like. Such compounds also are, of course, useful intermediates in the preparation of other organic substances either via reaction at the acetylenic bond or at the O= group. Moreover, their usefulness extends to the fields of petroleum and motor fuel additives, textile treating agents, adhesives, pharmaceuticals, rubber additives, resin additives, leather treating agents, cellulose and paper additives, preservatives, coatings, and the like. Illustrative of specific compounds of the foregoing type coming within the scope of this invention are:

1,4-bis(2,4-dichlorophenoxyacetoxy)-butyne-2
1,4-bis(2-methyl-4-chlorophenoxyacetoxy)-butyne-2
1,4-bis(phenolaminoacetoxy)-butyne-2
2-butyne-1,4-diol-bis(alpha-phthalimido acetate)

While compounds of the present invention may be employed in a variety of applications, biologically active or otherwise, when employed as biologically active materials, it will be understood, of course, that such compounds may be utilized in diverse formulations, both liquid and solid, including finely-divided powders and granular materials as well as liquids, e.g., solutions, concentrates, emulsifiable concentrates, slurries and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners such as various clays, diatomaceous earth, talc, spent catalyst, alumina silica materials and such liquid solvents, diluents, etc., as water and various organic liquids such as kerosene, acetone, benzene, toluene, xylene and other petroleum distillate fractions or mixtures thereof.

When liquid formulations are employed, or dried materials prepared which are to be used in liquid form, it is desirable, in certain instances, additionally to employ a wetting, emulsifying or dispersing agent to facilitate use of the formulation, e.g., Triton X-155 (alkyl aryl polyether alcohol).

Broadly, compounds of this invention may be prepared by reacting a compound of the structure $$Y-C\equiv C-(CZ_1Z_2)-OH$$

with a compound of the structure

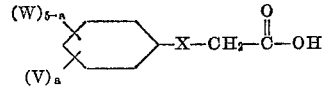

wherein Y is selected from the group consisting of hydrogen and —[$(CZ_3Z_4)$—OH], $Z_1$, $Z_2$, $Z_3$ and $Z_4$ are selected from the group consisting of hydrogen, alkyl and aryl radicals, X is selected from the group consisting of oxygen, NH,

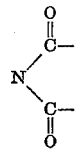

W is hydrogen, V is selected from the group consisting of halogens, alkyl radicals, OH radicals, NO radicals, $NO_2$ radicals, $SO_2NH_2$ radicals, and $SO_3H$ radicals, and $a$ is a number from 0 to 5.

Alternatively, compounds of this invention may also be prepared by reacting a compound of the structure

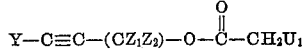

with a compound of the structure

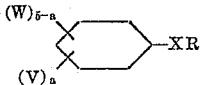

wherein Y is selected from the group consisting of hydrogen and

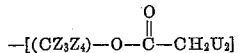

$U_1$ and $U_2$ are halogens, R is selected from the group consisting of hydrogen or alkali metals and $Z_1$, $Z_2$, $Z_3$, $Z_4$, X, V, W, and $a$ are as defined above.

More specifically, compounds of this invention may be prepared by chemically reacting a compound of the structure $$Y-C\equiv C-CH_2-OH$$

with a compound of the structure

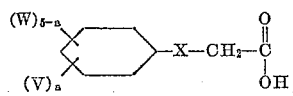

wherein Y is selected from the group consisting of hydrogen and —[CH$_2$—OH], X is selected from the group consisting of oxygen, NH, and

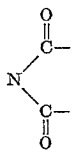

W is hydrogen, V is selected from the group consisting of halogens, alkyl radicals, OH radicals, NO radicals, NO$_2$ radicals, SO$_2$NH$_2$ radicals, and SO$_3$H radicals, and $a$ is a number from 0 to 5.

Alternatively, compounds of this invention may be prepared by reacting a compound of the structure

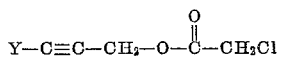

with a compound of the structure

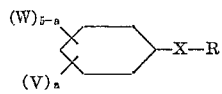

wherein Y is selected from the group consisting of hydrogen and

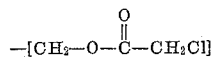

R is hydrogen or an alkali metal, and X, V, W and $a$ are as herein defined above.

In preparing compounds of the above type, it is generally desirable to effect the reaction by refluxing the reactants in an organic medium, such as, e.g., benzene, toluene, xylene, or other suitable organic liquids.

Further, it is desirable to employ as a reaction promoter, a minor amount of an agent which does not attack the acetylenic bond but which does facilitate the splitting out of water. Suitable reaction promoters include sulfonic acids, such as toluene sulfonic acid, benzene sulfonic acid, or xylene sulfonic acid. The specifically preferred promoter at present is p-toluene sulfonic acid.

In order that those skilled in the art may more completely understand the invention and the preferred method by which the same may be carried into effect, the following specific examples are offered:

EXAMPLE 1

*Preparation of 1,4-bis(2,4-dichlorophenoxyacetoxy)-2-butyne*

To a 2000 ml., 3-necked round-bottomed flask equipped with an agitator, reflux condenser and water trap is added 133 g. (0.6 mols) of recrystallized 2,4-dichlorophenoxyacetic acid and 26 g. (0.3 mol) of 2-butyne-1,4-diol. To the above is added 5 g. of p-toluene sulfonic acid and 500 ml. of benzene and the mixture is refluxed for about 4 hours until 11.5 ml. of water is separated (theoretical amount 10.8 ml.).

The solution is cooled, filtered, and then washed with two 100 ml. portions of water and once with a 150 ml. portion of 5% sodium bicarbonate solution. It is then dried by filtering through calcium chloride and 410 ml. of benzene are distilled off at atmospheric pressure. Upon cooling the distillation residue solidifies.

This solid (147 g.) is recrystallized from ethanol and 104 g. of a tan-colored, fluffy solid is obtained. This material melts between 110 and 111° C. Chemical analysis of this product indicates formation of the desired $C_{20}H_{14}Cl_4O_6$ and is as follows:

| Element | Actual, percent | Calculated, percent |
| --- | --- | --- |
| Cl | 28.8 | 28.9 |

EXAMPLE 2

To test phytotoxic effects, tomato plants, variety Bonny Best, 5 to 7″ tall; corn, variety Cornell M-1 (field corn), 4 to 6″ tall; bean, variety Tendergreen, just as the trifoliate leaves are beginning to unfold; and oats, variety Clinton, 3 to 5″ tall, are sprayed with an aqueous test formulation (0.65% (test chemical)—5% acetone—0.01% Triton X-155—balance water). The plants are sprayed with 100 ml. at 40 lbs. air pressure while being rotated on a turntable in a spray hood. Records are taken 14 days after treatment and phytotoxicity is rated on a scale from 0 to no injury to 11 for plant kill. Using this procedure and the material of Example 1, results indicate:

| Concentration Used, p.p.m. | Tomato | Corn | Bean | Oats |
| --- | --- | --- | --- | --- |
| 6,400 | 11 | 11 | 0 | 0 |
| 3,200 | 11 | 11 | 0 | 0 |
| 1,600 | 11 | 11 | 0 | 0 |
| 800 | 11 | 11 | 0 | 0 |
| 400 | 11 | 11 | 0 | 0 |
| 200 | 10 | 11 | 0 | 0 |

EXAMPLE 3

To evaluate the effect of (the test chemical of Example 1) upon the germination of seeds in soil, a mixture of seed of six crop plants is broadcast in 8 x 8 x 2 inch metal cake pans filled to within one-half inch of the top with composted greenhouse soil. The seed is uniformly covered with about one quarter inch of soil and watered. After 24 hours, 80 ml. of an aqueous test formulation (320 mg. of the material of Example 1—5% acetone—0.01% Triton X-155—balance water) at 10 lbs. air pressure is uniformly sprayed over the surface of the pan. This is equivalent to 64 lbs./acre. The seed mixture contains grasses: wheat, millet and rye grass. Two weeks after treatment records are taken on seedling stand as compared to the controls. Using this procedure, and varying concentrations of the chemical, the results are as follows:

| Concentration Used, lbs./acre | Percent Seedling Stand | |
| --- | --- | --- |
| | Broadleaf | Other Grasses |
| 64 | 0 | 5 |
| 32 | 0 | 5 |
| 4 | 0 | 20 |
| 2 | 0 | 50 |
| 1 | 0 | 75 |

EXAMPLE 4

To detect root absorption and translocation, tomato plants, variety Bonny Best, 5 to 7″ tall, and corn plants, variety Cornell M-1 (field corn), 4 to 6″ tall, are treated by pouring 51 ml. of a 2000 p.p.m. aqueous test formulation (2000 p.p.m. test chemical—5% acetone—0.01% Triton X-155—balance water) onto the soil of 4″ pots (102 mg./pot or approximately equivalent to 128 lbs./acre) in which the plants are growing. Plants are held under controlled greenhouse conditions for at least 10 days before examination after which phytotoxicity ratings are given based on a scale from 0 for no injury to 11 for plant kill. Using this procedure and the material of Example 1, results indicate:

| Concentration Used, lbs./acre | Tomato | Corn |
|---|---|---|
| 32 | 11 | 11 |
| 16 | 11 | 11 |
| 8 | 11 | 9 |
| 4 | 8 | 8 |

EXAMPLE 5

Insecticidal utility is shown in the following test. The bean aphid, *Aphis fabae*, is cultured on nasturtium plants. No attempt is made to select insects of a given age in this test. Test pots are prepared by reducing the number of nasturtium plants in 2½ inch culture pots until those remaining are infested with approximately 100 aphids. The infested test plants are treated with a formulation of the test chemical (2000 p.p.m. product of Example 1—5% acetone—0.01% Triton X-155—balance water). Based on counts made 24 hours after exposure 71% mortality is observed.

EXAMPLE 6

Insecticidal utility is shown in using the bean aphid, *Aphis fabae*, which is cultured on nasturtium plants. No attempt is made to select insects of a given age in this test. Nasturtium plants are infested with approximately 100 aphids at the time of treatment. The test plants are treated by pouring a formulation (2000 p.p.m. test chemical—5% acetone—0.01% Triton X-155—balance water) on the soil at the rate equivalent to 64 lbs./acre. Mortality of 100% is observed 24 hours after treatment for this concentration and 74% for a concentration of 32 lbs./acre.

EXAMPLE 7

*Preparation of 1,4-bis-(2-methyl-4-chlorophenoxyacetoxy)butyne-2*

To a 2000 ml., 3-necked flask, equipped with an agitator, reflux condenser, and water trap, is added 86.5 g. (1 mol) of 1,4-dihydroxy-2-butyne, 10 g. p-toluene sulfonic acid, 600 ml. benzene and 450 g. (2+ mols) of 2-methyl-4-chlorophenoxyacetic acid (90% pure). The mixture is refluxed until 34 ml. of water has collected. On cooling the mixture, a crop of crystals was separated from the mother liquor by filtration. Benzene is removed by distillation at reduced pressures and a light brown solid is formed. This solid is recrystallized from denatured ethanol and 284 g. of a cream-colored, light, fluffy solid is formed. Chemical analysis of this product indicates the formation of the desired $C_{22}H_{20}Cl_2O_6$ and is as follows:

| Element | Actual, percent | Calculated, percent |
|---|---|---|
| Cl | 15.5 | 15.7 |

EXAMPLE 8

Fungicidal utility is demonstrated by the ability of the test compound to protect tomato plants against the Late blight fungus, *Phytophthora infestans*. The method employs tomato plants 5 to 7 inches high of the variety Bonny Best. 100 ml. of the test formulation (2000 p.p.m. test chemical of Example 7—5% acetone—0.01% Triton X-155—the balance water) are sprayed on the plants at 40 lbs. air pressure while the plants are being rotated on a turntable in a spray chamber. After the spray deposit is dry, the treated plants and comparable untreated controls are sprayed with approximately 150,000 sporangia of *P. infestans* per ml. The plants are held in a saturated atmosphere for 24 hours at 60° F. to permit spore germination and infection. After 2 to 4 days, lesion counts are made on the three uppermost fully expanded leaves. Comparing the number of lesions on the test plants and control plants shows disease control of 50% on the test plants.

EXAMPLE 9

The product of Example 7 is tested in accordance with the procedure of Example 2. The results obtained on tomato plants, corn, bean, and oats, respectively, are as follows:

| Concentration Used, p.p.m. | Tomato | Corn | Bean | Oats |
|---|---|---|---|---|
| 6,400 | 10 | 11 | 3 | 2 |
| 3,200 | 10 | 11 | 0 | 0 |

EXAMPLE 10

In order to make an in vitro evaluation of the product of Example 7 as a contact poison, non-plant parasite nematodes (*Panagrellus redivivus*), are exposed to the test chemical in small watch glasses (27 mm. diameter x 8 mm. deep), within a 9 cm. Petri dish. An aqueous test formulation (1000 p.p.m. test chemical—5% acetone—0.01% Triton X-155—balance water) is used. Results are recorded 24 hours after treatment and from these it is shown that there is a nematode mortality of 50%.

EXAMPLE 11

The product of Example 7 is tested using the procedure of Example 6. The results obtained are as follows:

93% mortality is observed 24 hours after treatment using 64 lbs./acre.

EXAMPLE 12

The product obtained in Example 7 is tested according to the procedure of Example 4. The results obtained are as follows:

Using the equivalent of 8 pounds per acre the rating is 10.

EXAMPLE 13

*Preparation of 1,4-bis(phenolaminoacetoxy)-butyne-2*

To a 2000 ml., 3-necked, round-bottomed flask equipped with an agitator, reflux condenser, and water trap is added 119.5 g. (.5 mol) of 1,4-bis-(chloroacetoxy)-butyne-2 and 186.2 g. (2 mols) of aniline dissolved in 300 ml. of benzene. The mixture is refluxed for 1¼ hrs. at about 90° C. On cooling, crystals are formed, which crystals are removed by filtration. The liquid residue is water washed twice with 150 ml. portions of water. The benzene and unreacted aniline is then removed by steam distillation and a solid cake is formed. This material is recrystallized using six 500 ml. portions of denatured ethanol. 66.5 g. of a light-tan colored, light fluffy material is obtained, having a melting point of 117–118° C. Chemical analysis of this product indicates formation of the desired $C_{20}H_{20}N_2O_4$ and is as follows:

| Element | Actual, percent | Calculated, percent |
|---|---|---|
| H | 5.7 | 5.7 |

EXAMPLE 14

To evaluate insecticidal activity, a test is carried out whereby adult two-spotted spider mites, *Tetranychus bimaculatus*, maintained on Tendergreen beans under controlled conditions are transferred from a stock culture by leaf cuttings to uninfested seed leaves of bean plants in 2½ inch pots the day prior to testing. Formulation of the test chemical (2000 p.p.m. product of Example 13—5% acetone—0.01% Triton X-155—balance water) is sprayed onto the infested test plants. Counts are made after two days showing 40% mortality.

EXAMPLE 15

A tomato foliage disease test is conducted measuring the ability of (the test compound) to protect tomato foliage against infection by the Early blight fungus,

*Alternaria solani.* Tomato plants 5 to 7 inches high of the variety Bonny Best are employed. The plants are sprayed with 100 ml. of test formulation at 2000 p.p.m., test chemical of Example 13 in combination with 5% acetone—0.01% Triton X-155—and the balance water at 40 lbs. air pressure while being rotated on a turntable in a spray chamber. After the spray deposit is dry, the treated plants and comparable untreated controls are sprayed with a sport suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows 50% disease control.

EXAMPLE 16

Adult two-spotted spider mites, *Tetranychus bimaculatus*, maintained on Tendergreen beans under controlled conditions are used. Young bean plants, 3 to 4 inches tall thinned to two plants per 2½ inch pot, are treated by pouring a formulation (2000 p.p.m. test chemical of Example 13—5% acetone—0.01% Triton X-155—balance water) on the soil at the equivalent rate of 64 lbs./acre. 24 hours later, the four seed leaves in each pot are infested by leaf cuttings from Tendergreen bean plants infested with the said spider mite. Counts are recorded two or three days after the plants are infested showing significant mortality.

EXAMPLE 17

*Preparation of 2-butyne-1,4-diol-bis-(alpha-phthalimido acetate)*

To a 2000 ml., 3-necked, round-bottomed flask equipped with an agitator, reflux condenser and water trap is added 185 g. (1 mol) of potassium phthalimide, 119.5 g. (.5 mol) of 1,4-bis-chloroacetoxy-butyne-2 and 1500 ml. of ethylene glycol dimethyl ether (methyl Cellosolve). This mixture is refluxed at atmospheric pressure and 126° C. When the formation of solid KCl ceased, the solution is filtered while hot and on cooling a crop of crystals is formed. The crystals are filtered with suction and the methyl Cellosolve in the solution is distilled at about 2.5 cm. of mercury pressure. 193 g. of organic material is obtained from this distillation, which material is recrystallized twice in ethanol yielding 140 g. of material having a melting point of 104–106° C. Chemical analysis of this product indicates formation of the desired $C_{24}H_{16}N_2O_8$ and is as follows:

| Element | Actual, percent | Calculated, percent |
| --- | --- | --- |
| N | 5.89 | 6.08 |

EXAMPLE 18

The product of Example 17 is tested according to the procedure of Example 15 and shows a 62% disease control, at 2000 p.p.m.

EXAMPLE 19

Tomato, variety Bonny Best, plants growing in 4 inch pots are treated by pouring a test formulation (2000 p.p.m. test chemical of Example 17—5% acetone—0.01% Triton X-155—balance water) into the pots at an equivalent rate of 128 lbs./acre (102 mg./pot). The tomato plants are 3 to 4 inches tall at time of treatment. The tomato plants are exposed to Early blight by spraying with a spore suspension one week after treatment. After 48 hours observation indicates 53% disease control by comparison to the control plants.

It is to be understood that although the invention has been described with specific reference to particular embodiments thereof, it is not to be so limited, since changes and alterations therein may be made which are within the full intended scope of this invention as defined by the appended claims.

What is claimed is:

1. Compounds represented by the structure:

$$Y-C\equiv C-(CZ_1Z_2)-O-\overset{O}{\underset{\|}{C}}-CH_2-X_1-\underset{(V_1)_a}{\overset{(W_1)_{5-a}}{\bigcirc}}$$

wherein Y is selected from the group consisting of hydrogen and $$\left[-(CZ_3Z_4)-O-\overset{O}{\underset{\|}{C}}-CH_2-X_2-\underset{(V_2)_{a'}}{\overset{(W_2)_{5-a'}}{\bigcirc}}\right]$$

$a$ and $a'$ are numbers from 0 to 5, inclusive, $X_1$ and $X_2$ are selected from the group consisting of oxygen, NH, and $$\overset{O}{\underset{\|}{C}}-\\ N\\ \overset{\|}{\underset{O}{C}}-$$

$Z_1$, $Z_2$, $Z_3$, and $Z_4$ are selected from the group consisting of hydrogen, and lower alkyl radicals, $W_1$ and $W_2$ are hydrogen and $V_1$ and $V_2$ are selected from the group consisting of chlorine, fluorine, bromine and iodine, lower alkyl radicals, OH, NO, $NO_2$, $SO_2NH_2$, and $SO_3H$.

2. 1,4-bis-(2,4-dichlorophenoxyacetoxy)-butyne-2.
3. 1,4 - bis - (2 - methyl - 4 - chlorophenoxyacetoxy)-butyne-2.
4. 1,4-bis-(phenolaminoacetoxy)-butyne-2.
5. 2-butyne-1,4-diol-bis-(alpha-phthalimido acetate).
6. The method of preparing a compound of the structure:

$$Y-C\equiv C-(CZ_1Z_2)-O-\overset{O}{\underset{\|}{C}}-CH_2-X_1-\underset{(V_1)_a}{\overset{(W_1)_{5-a}}{\bigcirc}}$$

which comprises mixing a compound of the structure $$Y'-C\equiv C-(CZ_1Z_2)-OH$$

with a compound of the structure $$\underset{(V_1)_a}{\overset{(W_1)_{5-a}}{\bigcirc}}-X_1-CH_2-\overset{O}{\underset{\|}{C}}-OH$$

wherein Y is selected from the group consisting of hydrogen and $$\left[-(CZ_3Z_4)-O-\overset{O}{\underset{\|}{C}}-CH_2-X_2-\underset{(V_2)_{a'}}{\overset{(W_2)_{5-a'}}{\bigcirc}}\right]$$

Y' is selected from the group consisting of hydrogen and $[(CZ_3Z_4)-OH]$, $a$ and $a'$ are numbers from 0 to 5, inclusive, $X_1$ and $X_2$ are selected from the group consisting of oxygen, NH, and $$\overset{O}{\underset{\|}{C}}-\\ N\\ \overset{\|}{\underset{O}{C}}-$$

selected from the group consisting of hydrogen, and lower alkyl radicals, $W_1$ and $W_2$ are selected from the group consisting of chlorine, fluorine, bromine and iodine, lower alkyl radicals, OH, NO, $NO_2$, $SO_2NH_2$, and $SO_3H$, heating the resulting mixture in an organic media, under reflux conditions, until substantially no further water is formed in the reaction mixture, and separating the thus-formed acetylenic compound from the reaction mixture by crystallization.

7. The method of preparing a compound of the structure

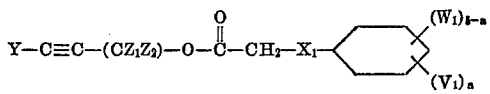

which comprises mixing a compound of the structure

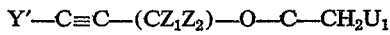

with a compound of the structure

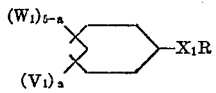

wherein Y is selected from the group consisting of hydrogen and

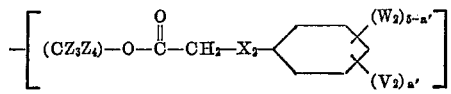

Y' is selected from the group consisting of hydrogen and

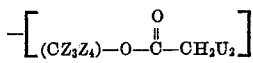

$U_1$ and $U_2$ are halogens, R is selected from the group consisting of hydrogen and alkali metals, $a$ and $a'$ are numbers from 0 to 5, inclusive, $X_1$ and $X_2$ are selected from the group consisting of oxygen, NH, and

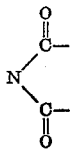

$Z_1$, $Z_2$, $Z_3$, and $Z_4$ are selected from the group consisting of hydrogen, and lower alkyl radicals, $W_1$ and $W_2$ are hydrogen and $V_1$ and $V_2$ are selected from the group consisting of chlorine, fluorine, bromine and iodine, lower alkyl radicals, OH, NO, $NO_2$, $SO_2NH_2$, and $SO_3H$, heating the resulting mixture in an organic media, under reflux conditions, until substantially no further water is formed in the reaction mixture, and separating the thus-formed acetylenic compound from the reaction mixture by crystallization.

8. The method of preparing 1,4-bis-(2,4-dichlorophenoxyacetoxy)-2-butyne which comprises mixing 2,4-dichlorophenoxyacetic acid with 2-butyne-1,4-diol, heating the resulting mixture in an organic media, under reflux conditions, until substantially no further water is formed in the reaction mixture, and separating the thus-formed 1,4-bis-(2,4-dichlorophenoxyacetoxy)-2-butyne from the reaction mixture by crystallization.

9. The method of preparing 1,4-bis-(2-methyl-4-chlorophenoxyacetoxy)-butyne-2 which comprises mixing 2-methyl-4-chlorophenoxyacetic acid with 1,4-dihydroxy-2-butyne, heating the resulting mixture in an organic media, under reflux conditions, until substantially no further water is formed in the reaction mixture, and separating the thus-formed 1,4 - bis - (2 - methyl - 4 - chlorophenoxyacetoxy)-butyne-2 from the reaction mixture by crystallization.

10. The method of preparing 1,4-bis(phenolaminoacetoxy)-butyne-2 which comprises mixing 1,4-bis-(chloroacetoxy)-butyne-2 with aniline, heating the resulting mixture in an organic media, under reflux conditions, until substantially no further water is formed in the reaction mixture, and separating the thus-formed 1,4-bis-(phenolaminoacetoxy)-butyne-2 from the reaction mixture by crystallization.

11. The method of preparing 2-butyne-1,4-diol-bis-(alpha-phthalimido acetate) which comprises mixing 1,4-bis-chloroacetoxy-butyne-2 with potassium phthalimid, heating the resulting mixture in an organic media, under reflux conditions, until substantially no further potassium chloride is formed, and separating the thus-formed 2-butyne-1,4-diol-bis-(alpha-phthalimido acetate) from the reaction mixture by crystallization.

References Cited in the file of this patent

UNITED STATES PATENTS

| | | |
|---|---|---|
| 2,250,445 | Bruson et al. | July 29, 1941 |
| 2,548,509 | Yowell | Apr. 10, 1951 |
| 2,558,675 | Flory | July 26, 1951 |
| 2,658,017 | Mashafer | Nov. 3, 1953 |
| 2,704,244 | Goodhue et al. | Mar. 15, 1955 |
| 2,708,624 | Denny | May 17, 1955 |
| 2,743,210 | Jones | Apr. 24, 1956 |
| 2,744,819 | Toornman | May 8, 1956 |
| 2,830,048 | Biel | Apr. 8, 1958 |
| 2,852,426 | Stansbury | Sept. 16, 1958 |

UNITED STATES PATENT OFFICE
CERTIFICATION OF CORRECTION

Patent No. 3,005,828                          October 24, 1961

Joseph R. Baldridge

It is hereby certified that error appears in the above numbered patent requiring correction and that the said Letters Patent should read as corrected below.

Column 7, line 9, for "sport" read -- spore --; column 8, line 66, before "selected" insert -- $Z_1$, $Z_2$, $Z_3$, and $Z_4$ are --; line 68, after "$W_2$" insert -- are hydrogen and $V_1$ and $V_2$ --; column 9, lines 11 to 14, the formula should appear as shown below instead of as in the patent:

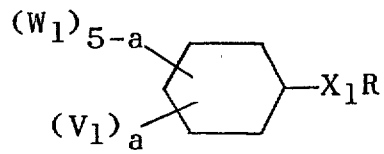

Signed and sealed this 17th day of April 1962.

(SEAL)
Attest:

ESTON G. JOHNSON                        DAVID L. LADD
Attesting Officer                     Commissioner of Patents